(12) United States Patent
Jin et al.

(10) Patent No.: US 12,404,941 B2
(45) Date of Patent: Sep. 2, 2025

(54) COMBINED FOUR-WAY VALVE, AIR CONDITIONING SYSTEM AND VEHICLE

(71) Applicant: ZHEJIANG DUNAN ARTIFICIAL ENVIRONMENT CO., LTD., Zhejiang (CN)

(72) Inventors: Ju Jin, Zhejiang (CN); Fugang Wang, Zhejiang (CN); Wenrong Zhang, Zhejiang (CN); Zhiguo Song, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 0 days.

(21) Appl. No.: 18/689,844

(22) PCT Filed: Sep. 2, 2022

(86) PCT No.: PCT/CN2022/116855
§ 371 (c)(1),
(2) Date: Mar. 6, 2024

(87) PCT Pub. No.: WO2023/030502
PCT Pub. Date: Mar. 9, 2023

(65) Prior Publication Data
US 2024/0384803 A1    Nov. 21, 2024

(30) Foreign Application Priority Data

Sep. 6, 2021  (CN) .......................... 202111040533.9
Sep. 6, 2021  (CN) .......................... 202122143373.2
Sep. 6, 2021  (CN) .......................... 202122144603.7

(51) Int. Cl.
*F16K 11/22*   (2006.01)
*B60H 1/00*    (2006.01)

(52) U.S. Cl.
CPC .......... *F16K 11/22* (2013.01); *B60H 1/00485* (2013.01)

(58) Field of Classification Search
CPC .......... F16K 11/22; F16K 11/24; F25B 41/20; F25B 41/325; F25B 41/345; B60H 1/00485
See application file for complete search history.

(56) References Cited

U.S. PATENT DOCUMENTS 3,538,947 A    11/1970   Leiber
4,013,094 A *  3/1977    Niskanen ................ F16K 35/14
                                                        137/597

(Continued)

FOREIGN PATENT DOCUMENTS

CN    208012177 U    10/2018
CN    109028388 A    12/2018

(Continued)

OTHER PUBLICATIONS

Extended Search Report of counterpart EP application No. 22863636.1 issued on Jul. 22, 2025.

*Primary Examiner* — Reinaldo Sanchez-Medina
(74) *Attorney, Agent, or Firm* — The Sun IP Law

(57) ABSTRACT

Disclosed are a combined four-way valve, an air conditioning system, and a vehicle. The combined four-way valve includes a valve seat, a first control valve, a second control valve, a third control valve and a fourth control valve, where the valve seat is internally provided with an input port, an output port, a first opening, a second opening, and a plurality of valve cavities which are arranged at intervals and are arranged corresponding to the control valves on a one-to-one correspondence manner; the plurality of valve cavities include a first valve cavity, a second valve cavity, a third valve cavity and a fourth valve cavity; the valve cavities are in communication with one another by channels; the valve (Continued)

cavities are provided with inlets and outlets, and are in communication with flow channels in the valve seat.

20 Claims, 7 Drawing Sheets

(56) References Cited

U.S. PATENT DOCUMENTS

| | | | |
|---|---|---|---|
| 2017/0089623 A1* | 3/2017 | Kamitani | F24F 1/20 |
| 2019/0226737 A1* | 7/2019 | He | F25B 13/00 |
| 2019/0301619 A1 | 10/2019 | Wu et al. | |
| 2020/0031198 A1 | 1/2020 | Chen et al. | |
| 2022/0074371 A1* | 3/2022 | Lucka | F16K 31/082 |
| 2022/0134841 A1* | 5/2022 | Jeong | B60H 1/00921 62/79 |
| 2022/0252166 A1* | 8/2022 | Chang | F16K 27/065 |
| 2024/0017587 A1* | 1/2024 | Jin | F25B 25/005 |

FOREIGN PATENT DOCUMENTS

| | | |
|---|---|---|
| CN | 112443704 A | 3/2021 |
| CN | 215793071 U | 2/2022 |
| CN | 216158364 U | 4/2022 |
| WO | 2021049435 A1 | 3/2021 |

* cited by examiner

COMBINED FOUR-WAY VALVE, AIR CONDITIONING SYSTEM AND VEHICLE

CROSS-REFERENCES TO RELATED APPLICATIONS

The present disclosure is a national stage application of International Patent Application No. PCT/CN2022/116855, which is filed on Sep. 2, 2022. The International Patent Application claims the priority of Chinese Application No. 202111040533.9, filed in the Chinese Patent Office on Sep. 6, 2021, and entitled "Combined Four-way Valve, Air Conditioning System and Vehicle", claims the priority of Chinese Application No. 202122144603.7, filed in the Chinese Patent Office on Sep. 6, 2021, and entitled "Combined Four-way Valve, Air Conditioning System and Vehicle", and claims the priority of Chinese Application No. 202122143373.2, filed in the Chinese Patent Office on Sep. 6, 2021, and entitled "Integrated Control Multi-way Valve and Air Conditioning System", the entire contents of which are herein incorporated by reference.

TECHNICAL FIELD

The present disclosure relates to a technical field of control valves, and more particularly to a combined four-way valve, an air conditioning system, and a vehicle.

BACKGROUND

A household air conditioning system is usually provided with a four-way valve, and a flow direction of a refrigerant can be changed by actions of the four-way valve, thereby switching refrigeration and heating. The existing four-way valve achieves a flow path switching function by means of moving of one sliding block. However, the sliding block has a poor stability, and normal functions will be affected in case of moving of the sliding block in a use process. Therefore, the existing four-way valve is relatively applicable to a stable working environment, for example, in a fixed building. There is relatively great vibration in environments such as traveling vehicles, and thus the existing four-way valve cannot adapt to such environments. It is necessary to design a new four-way valve so as to adapt to the unstable working environments such as the vehicles.

SUMMARY

The present disclosure provides a combined four-way valve, an air conditioning system, and a vehicle, so as to adapt to unstable working environments such as vehicles.

In order to achieve the above purpose, according to one aspect of the present disclosure, some embodiments of the present disclosure provide the combined four-way valve, including: a valve seat, where the valve seat is internally provided with an input port, an output port, a first opening, a second opening, and a plurality of valve cavities which are arranged at intervals; each of the valve cavities is provided with an inlet and an outlet; the plurality of valve cavities include a first valve cavity, a second valve cavity, a third valve cavity and a fourth valve cavity; an inlet of the first valve cavity is in communication with the input port, an outlet of the first valve cavity is in communication with an outlet of the fourth valve cavity, the outlet of the fourth valve cavity is in communication with the second opening, an inlet of the second valve cavity is in communication with an inlet of the first valve cavity, an outlet of the second valve cavity is in communication with an outlet of the third valve cavity, the outlet of the third valve cavity is in communication with the first opening, an inlet of the third valve cavity is in communication with an inlet of the fourth valve cavity, and the inlet of the fourth valve cavity is in communication with the output port; a first control valve which is arranged in the first valve cavity in an openable and closable manner so as to control the inlet and the outlet of the first valve cavity to be in communication with or be disconnected from each other; a second control valve which is arranged in the second valve cavity in an openable and closable manner so as to control the inlet and the outlet of the second valve cavity to be in communication with or be disconnected from each other; a third control valve which is arranged in the third valve cavity in an openable and closable manner so as to control the inlet and the outlet of the third valve cavity to be in communication with or be disconnected from each other; and a fourth control valve which is arranged in the fourth valve cavity in an openable and closable manner so as to control the inlet and the outlet of the fourth valve cavity to be in communication with or be disconnected from each other; wherein the combined four-way valve is capable of being switched to any one of a first operating state and a second operating state; under the circumstance that the combined four-way valve is in the first operating state, the second control valve and the fourth control valve are opened, and the first control valve and the third control valve are closed, such that the input port is in communication with the first opening, and the second opening is in communication with the output port; and under the circumstance that the combined four-way valve is in the second operating state, the second control valve and the fourth control valve are closed, and the first control valve and the third control valve are opened, such that the input port is in communication with the second opening, and the first opening is in communication with the output port.

In some embodiments, the valve seat is further internally provided with a first channel, a second channel, a third channel and a fourth channel; the inlet of the first valve cavity is in communication with the inlet of the second valve cavity by the first channel; the inlet of the third valve cavity is in communication with the inlet of the fourth valve cavity by the second channel; the outlet of the first valve cavity is in communication with the outlet of the fourth valve cavity by the third channel; and the outlet of the second valve cavity is in communication with the outlet of the third valve cavity by the fourth channel.

In some embodiments, the first channel and the input port are arranged coaxially, and the second channel and the output port are arranged coaxially; and the second valve cavity is located on a side of the first valve cavity facing away from the input port, and the third valve cavity is located on a side of the fourth valve cavity facing away from the output port.

In some embodiments, the third channel and the second opening are arranged coaxially, and the fourth channel and the first opening are arranged coaxially; and the first valve cavity is located on a side of the fourth valve cavity facing away from the second opening, and the second valve cavity is located on a side of the third valve cavity facing away from the first opening.

In some embodiments, the first channel, the second channel, the third channel and the fourth channel are blind holes.

In some embodiments, depth directions of the plurality of valve cavities are the same direction, and in the depth directions of the plurality of valve cavities, the valve seat is provided with a first region and a second region which are spaced apart from each other; and the input port, the output port and inlets of the plurality of valve cavities are located in the first region, and the first opening, the second opening and outlets of the plurality of valve cavities are located in the second region.

In some embodiments, an axis of the input port is parallel to an axis of the output port, an axis of the first opening is parallel to an axis of the second opening, the axis of the input port is perpendicular to the axis of the first opening, the axis of the input port is perpendicular to the depth directions of the plurality of valve cavities, and the axis of the first opening is perpendicular to the depth directions of the plurality of valve cavities.

In some embodiments, the first control valve, the second control valve, the third control valve and the fourth control valve are electronic expansion valves; and the first control valve, the second control valve, the third control valve and the fourth control valve are detachably arranged on the valve seat.

In some embodiments, the combined four-way valve further includes a control portion, where the control portion includes a protective box, and a circuit board and a plurality of coils which are arranged in the protective box; the protective box is connected with the valve seat; the plurality of coils are electrically connected with the plurality of control valves in a one-to-one correspondence manner; and the plurality of coils are electrically connected to the circuit board.

In some embodiments, the circuit board is provided with an integrated module and a conversion circuit module, the integrated module is connected with the conversion circuit module, and the plurality of coils are connected to the conversion circuit module.

In some embodiments, the protective box includes a box body and a cover plate which are connected to each other, the box body is provided with an accommodating cavity, the circuit board is located in the accommodating cavity, and the plurality of coils are fixed in the accommodating cavity.

In some embodiments, the circuit board is provided with a plurality of avoidance holes, and the plurality of coils penetrate into the plurality of avoidance holes in a one-to-one correspondence manner.

In some embodiments, the combined four-way valve further includes a fixing member, where the protective box is connected with the valve seat by the fixing member.

In some embodiments, the protective box is provided with a plurality of convex columns; the fixing member includes an annular member and a connecting member which are connected to each other; the annular member surrounds the plurality of control valves; the annular member is provided with a plurality of fixing holes; the plurality of convex columns penetrate into the plurality of fixing holes in a one-to-one correspondence manner; and the connecting member is connected with the valve seat by fasteners.

According to another aspect of the present disclosure, the air conditioning system is provided. The air conditioning system includes a heat exchanger and the above combined four-way valve, where the heat exchanger is provided with a first refrigerant port and a second refrigerant port, the first refrigerant port is in communication with the first opening of the combined four-way valve, and the second refrigerant port is in communication with the second opening of the combined four-way valve.

According to another aspect of the present disclosure, the vehicle is provided. The vehicle includes the above air conditioning system.

By applying the technical solution of the present disclosure, the combined four-way valve is provided. The combined four-way valve includes the valve seat, the first control valve, the second control valve, the third control valve and the fourth control valve, where the valve seat is internally provided with the input port, the output port, the first opening, the second opening, and the plurality of valve cavities which are arranged at intervals; each of the valve cavities is provided with the inlet and the outlet; the plurality of valve cavities include the first valve cavity, the second valve cavity, the third valve cavity and the fourth valve cavity; the first control valve controls the inlet and the outlet of the first valve cavity to be in communication with or be disconnected from each other; the second control valve controls the inlet and the outlet of the second valve cavity to be in communication with or be disconnected from each other; the third control valve controls the inlet and the outlet of the third valve cavity to be in communication with or be disconnected from each other; the fourth control valve controls the inlet and the outlet of the fourth valve cavity to be in communication with or be disconnected from each other; where the combined four-way valve is capable of being switched to any one of the first operating state and the second operating state; under the circumstance that the combined four-way valve is in the first operating state, the second control valve and the fourth control valve are opened, and the first control valve and the third control valve are closed, such that the input port is in communication with the first opening, and the second opening is in communication with the output port; and under the circumstance that the combined four-way valve is in the second operating state, the second control valve and the fourth control valve are closed, and the first control valve and the third control valve are opened, such that the input port is in communication with the second opening, and the first opening is in communication with the output port. In this solution, the plurality of control valves are used for respectively controlling the corresponding valve cavities to be opened and closed, and flow paths can be switched by means of opening and closing actions of the different control valves. This solution replaces the manner of using a sliding block in existing four-way valves, such that the problem of the sliding block being easy to move in a vibrating environment is avoided. In addition, the combined four-way valve in this solution switches the flow paths by means of cooperation of the plurality of control valves and can change a flow direction of a refrigerant, for example, the first operating state is applicable to a refrigeration condition, and the second operating state is applicable to a heating condition. The combined four-way valve provided in this solution has the high stability, and can adapt to unstable working environments such as vehicles, therefore ensuring reliable operation.

BRIEF DESCRIPTION OF THE DRAWINGS

Drawings constituting a portion of the present disclosure are used for providing a further understanding to the present disclosure. Schematic embodiments of the present disclosure and descriptions thereof are intended to explain the present disclosure, and should not be construed to unduly limit the present disclosure. In the drawings.

Figure 1:
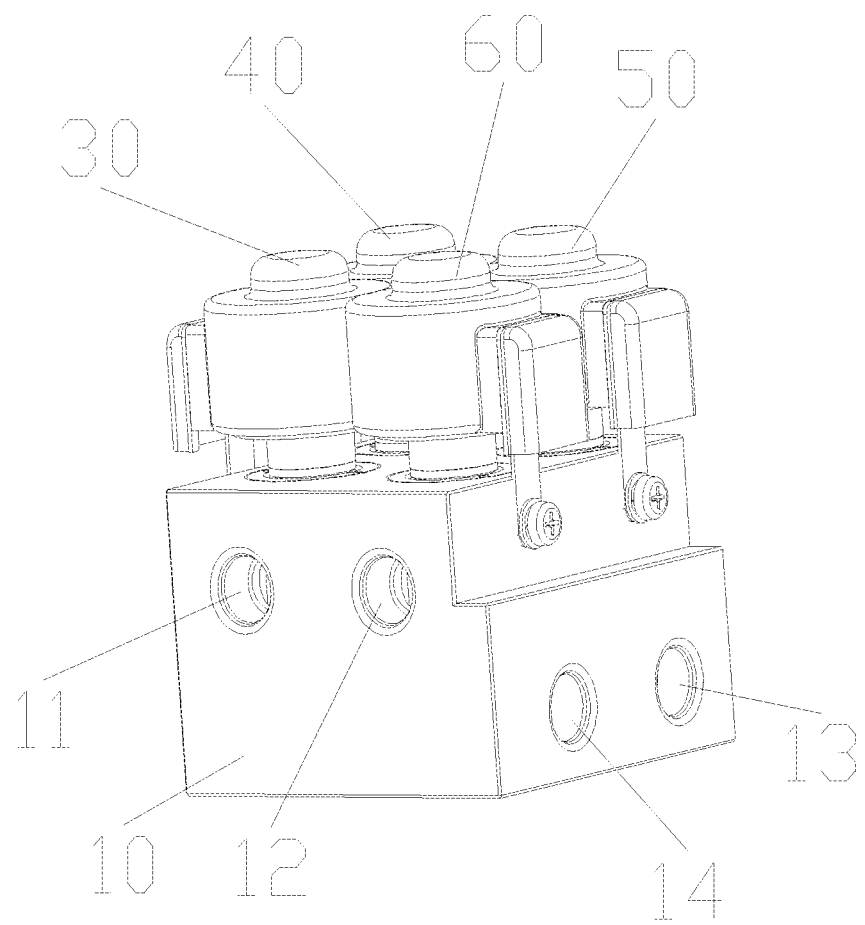
FIG. 1 shows a structural schematic diagram of a combined four-way valve provided in an embodiment of the present disclosure.
Figure 2:
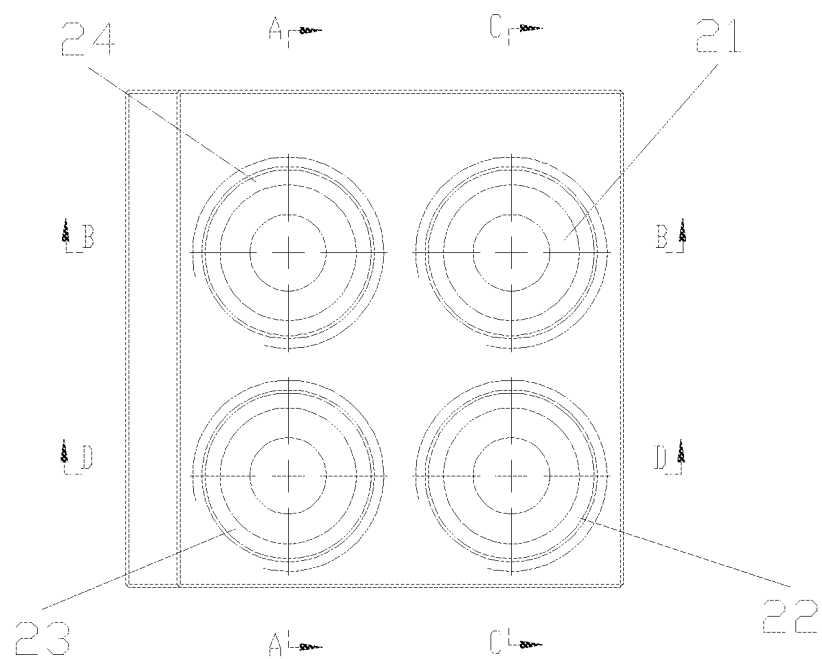
FIG. 2 shows a top view of a valve seat in FIG. 1.
Figure 3:
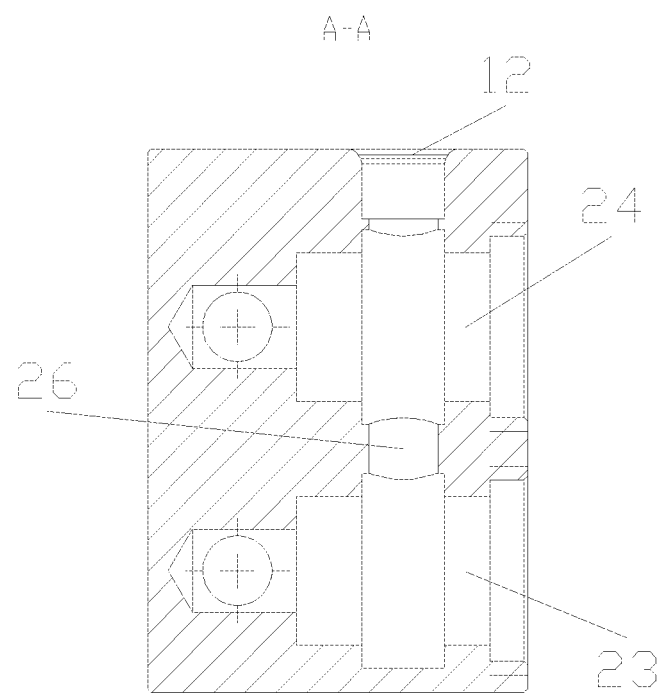
FIG. 3 shows a sectional view of the valve seat in FIG. 2 at position A-A.
Figure 4:
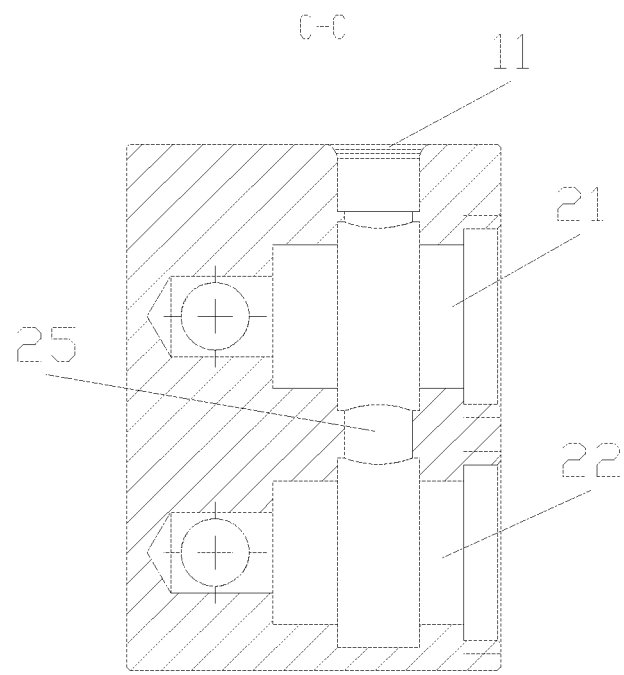
FIG. 4 shows a sectional view of the valve seat in FIG. 2 at position C-C.
Figure 5:
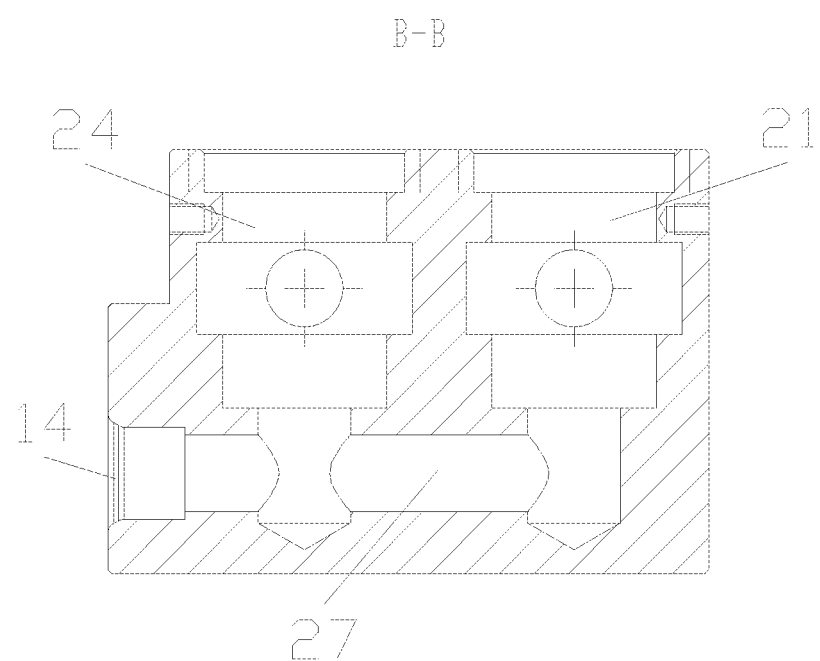
FIG. 5 shows a sectional view of the valve seat in FIG. 2 at position B-B.
Figure 6:
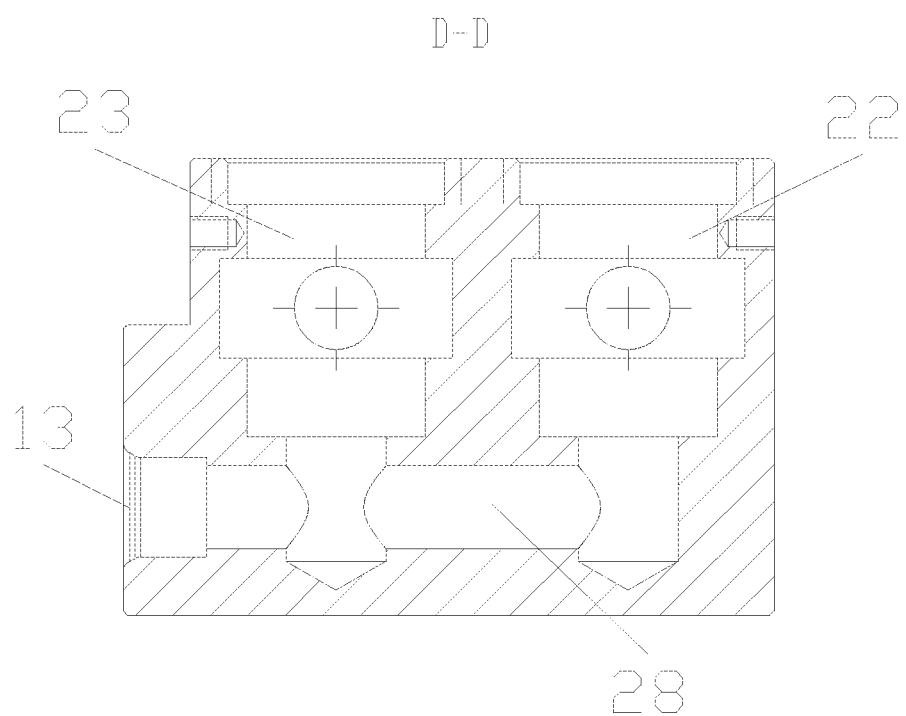
FIG. 6 shows a sectional view of the valve seat in FIG. 2 at position D-D.

The above drawings include the following reference numerals:

10. valve seat; 11. input port; 12. output port; 13. first opening; 14. second opening; 21. first valve cavity; 22. second valve cavity; 23. third valve cavity; 24. fourth valve cavity; 25. first channel; 26. second channel; 27. third channel; 28. fourth channel; 30. first control valve; 40. second control valve; 50. third control valve; 60. fourth control valve; 70. heat exchanger; 80. control portion; 81. protective box; 811. box body; 812. cover plate; 813. boss; 82. circuit board; 821. avoidance hole; 83. coil; 90. fixing member; 91. annular member; and 92. connecting member.

DETAILED DESCRIPTION OF THE EMBODIMENTS

The technical solutions in embodiments of the present disclosure will be described clearly and completely below in conjunction with the accompanying drawings in the embodiments of the present disclosure. Obviously, the described embodiments are only part of embodiments of the present disclosure, not all of them. Actually, the following description of at least one exemplary embodiment is only for the illustrative purpose, and shall not be construed as any limitation on the present disclosure or the disclosure and use thereof. On the basis of the embodiments of the present disclosure, all other embodiments obtained by those of ordinary skill in the art without involving any inventive effort should fall within the scope of protection of the present disclosure.

As shown in FIGS. 1-6, one embodiment of the present disclosure provides a combined four-way valve, including: a valve seat 10, where the valve seat 10 is internally provided with an input port 11, an output port 12, a first opening 13, a second opening 14, and a plurality of valve cavities which are arranged at intervals; each of the valve cavities is provided with an inlet and an outlet; the plurality of valve cavities include a first valve cavity 21, a second valve cavity 22, a third valve cavity 23 and a fourth valve cavity 24; an inlet of the first valve cavity 21 is in communication with the input port 11, an outlet of the first valve cavity 21 is in communication with an outlet of the fourth valve cavity 24, the outlet of the fourth valve cavity 24 is in communication with the second opening 14, an inlet of the second valve cavity 22 is in communication with the inlet of the first valve cavity 21, an outlet of the second valve cavity 22 is in communication with an outlet of the third valve cavity 23, the outlet of the third valve cavity 23 is in communication with the first opening 13, an inlet of the third valve cavity 23 is in communication with an inlet of the fourth valve cavity 24, and the inlet of the fourth valve cavity 24 is in communication with the output port 12; a first control valve 30 which is arranged in the first valve cavity 21 in an openable and closable manner so as to control the inlet and the outlet of the first valve cavity 21 to be in communication with or be disconnected from each other; a second control valve 40 which is arranged in the second valve cavity 22 in an openable and closable manner, so as to control the inlet and the outlet of the second valve cavity 22 to be in communication with or be disconnected from each other; a third control valve 50 which is arranged in the third valve cavity 23 in an openable and closable manner so as to control the inlet and the outlet of the third valve cavity 23 to be in communication with or be disconnected from each other; and a fourth control valve 60 which is arranged in the fourth valve cavity 24 in an openable and closable manner so as to control the inlet and the outlet of the fourth valve cavity 24 to be in communication with or be disconnected from each other; wherein the combined four-way valve is capable of being switched to any one of a first operating state and a second operating state; under the circumstance that the combined four-way valve is in the first operating state, the second control valve 40 and the fourth control valve 60 are opened, and the first control valve 30 and the third control valve 50 are closed, such that the input port 11 is in communication with the first opening 13, and the second opening 14 is in communication with the output port 12; and under the circumstance that the combined four-way valve is in the second operating state, the second control valve 40 and the fourth control valve 60 are closed, and the first control valve 30 and the third control valve 50 are opened, such that the input port 11 is in communication with the second opening 14, and the first opening 13 is in communication with the output port 12.

In this solution, the plurality of control valves are used for respectively controlling corresponding valve cavities to be opened and closed, and flow paths can be switched by opening and closing actions of the different control valves. This solution replaces the manner of using a sliding block in existing four-way valves, such that a problem of the sliding block being prone to move in a vibrating environment is avoided. In addition, the combined four-way valve in this solution switches the flow paths by means of cooperation of the plurality of control valves and can change a flow direction of a refrigerant, for example, the first operating state is applicable to a refrigeration condition, and the second operating state is applicable to a heating condition. The combined four-way valve provided in this solution has a high stability, and is able to adapt to unstable working environments such as vehicles, therefore ensuring reliable operation.

In this solution, the valve seat 10 is internally provided with the plurality of valve cavities at intervals, each of the valve cavities is internally provided with the inlet and the outlet, the input port 11, the output port 12, the first opening 13 and the second opening 14 in the valve seat 10 are in communication with the inlets or the outlets of the first valve cavity 21, the second valve cavity 22, the third valve cavity 23 and the fourth valve cavity 24 to form flow channels in the combined four-way valve, the flow channels are simpler than those of existing valve seats 10, and the communication or disconnection of the inlets and the outlets in the valve cavities is controlled by the first control valve 30, the second control valve 40, the third control valve 50 and the fourth control valve 60 which are correspondingly arranged in the valve cavities in the openable and closable manner, thereby achieving the different operating states.

In some embodiments, the valve seat 10 is further internally provided with a first channel 25, a second channel 26, a third channel 27 and a fourth channel 28; the inlet of the first valve cavity 21 is in communication with the inlet of the second valve cavity 22 by the first channel 25; the inlet of the third valve cavity 23 is in communication with the inlet of the fourth valve cavity 24 by the second channel 26; the outlet of the first valve cavity 21 is in communication with the outlet of the fourth valve cavity 24 by the third channel 27; and the outlet of the second valve cavity 22 is in communication with the outlet of the third valve cavity 23 by the fourth channel 28. The valve cavities are connected by the channels, which greatly simplifies the flow channels, and facilitates machining of the flow channels.

In some embodiments, the first channel 25 and the input port 11 are arranged coaxially, and the second channel 26 and the output port 12 are arranged coaxially; and the second valve cavity 22 is located on a side of the first valve cavity 21 facing away from the input port 11, and the third valve cavity 23 is located on a side of the fourth valve cavity 24 facing away from the output port 12. In this way, it is ensured that portions to be machined are located on the same path, such that the channels can be machined and formed with the machining of the input port 11, the output port 12, the first opening 13 and the second opening 14, and machining steps for the valve seat 10 are simplified.

In this solution, the flow channels in the valve seat 10 are straight flow channels, there is no flow channel needing complex machining, and thus the flow channels in the valve seat 10 include: a flow channel where the input port 11 is located, a flow channel where the output port 12 is located, a flow channel where the first opening 13 is located, and a flow channel where the second opening 14 is located; in addition, the first valve cavity 21, the second valve cavity 22, the third valve cavity 23 and the fourth valve cavity 24 are relatively easy to machine and are not required to be machined into through holes during machining, thereby avoiding the situation that plugs are needed to block redundant openings.

In some embodiments, axes of an inlet and an outlet of each control valve are perpendicular to an axis of the control valve, the axis of the inlet of the control valve is perpendicular to the axis of the outlet of the control valve, the each control valve is arranged in a corresponding valve cavity in the openable and closable manner, the inlet of the control valve and the flow channel where the input port 11 or the output port 12 is located are arranged coaxially, and the outlet of the control valve and the flow channel where the first opening 13 or the second opening 14 is located are arranged coaxially. In this solution, each control valve controls the communication or disconnection of the internal flow channels by controlling the opening and closing of a region between the inlet and the outlet.

In some embodiments, the first channel 25, the second channel 26, the third channel 27 and the fourth channel 28 are blind holes. Different from the configuration manner of blocking one end of each through hole in a related art, this solution avoids fluid leakage caused by using blocking plugs; in addition, during machining of the blind holes in this solution, the situation that machining burrs affect mounting of the first control valve 30, the second control valve 40, the third control valve 50 and the fourth control valve 60 can be avoided.

In this solution, depth directions of the plurality of valve cavities are the same direction, and in the depth directions of the plurality of valve cavities, the valve seat 10 is provided with a first region and a second region which are spaced apart from each other; and the input port 11, the output port 12 and the inlets of the plurality of valve cavities are located in the first region, and the first opening 13, the second opening 14 and the outlets of the plurality of valve cavities are located in the second region. Thus, the arrangement of the openings is facilitated, the lengths of the flow channels are shortened, the compactness of the valve seat 10 is improved, and the size of the valve seat 10 is reduced.

In some embodiments, an axis of the input port 11 is parallel to an axis of the output port 12, an axis of the first opening 13 is parallel to an axis of the second opening 14, the axis of the input port 11 is perpendicular to the axis of the first opening 13, the axis of the input port 11 is perpendicular to the depth directions of the plurality of valve cavities, and the axis of the first opening 13 is perpendicular to the depth directions of the plurality of valve cavities.

In this way, the design of the flow channels in the valve seat 10 is simplified, design and fitting can be performed according to relative positions of the input port 11, the output port 12, the first opening 13, the second opening 14 and all the valve cavities, and positions of the flow channels are determined in space, thereby further simplifying the flow channels, facilitating machining, and reducing the production cost.

In some embodiments, the first control valve 30, the second control valve 40, the third control valve 50 and the fourth control valve 60 are electronic expansion valves; and the first control valve 30, the second control valve 40, the third control valve 50 and the fourth control valve 60 are detachably arranged on the valve seat. With the adoption of the electronic expansion valves, a speed of the combined four-way valve for a thermal reaction is increased, the evaporation speed is stabler, meanwhile, the adverse effect caused by the excessively high temperature is also prevented, and the reliability is improved. In addition, the electronic expansion valves not only have the function of opening and closing valve ports, but also have the function of adjusting the flow, and thus the combined four-way valve also has the effect of adjusting the flow, which enriches the functions of the combined four-way valve.

In this embodiment, the plurality of control valves, including the first control valve 30, the second control valve 40, the third control valve 50 and the fourth control valve 60, of the combined four-way valve are respectively provided with coils and are separately controlled.

Figure 7:
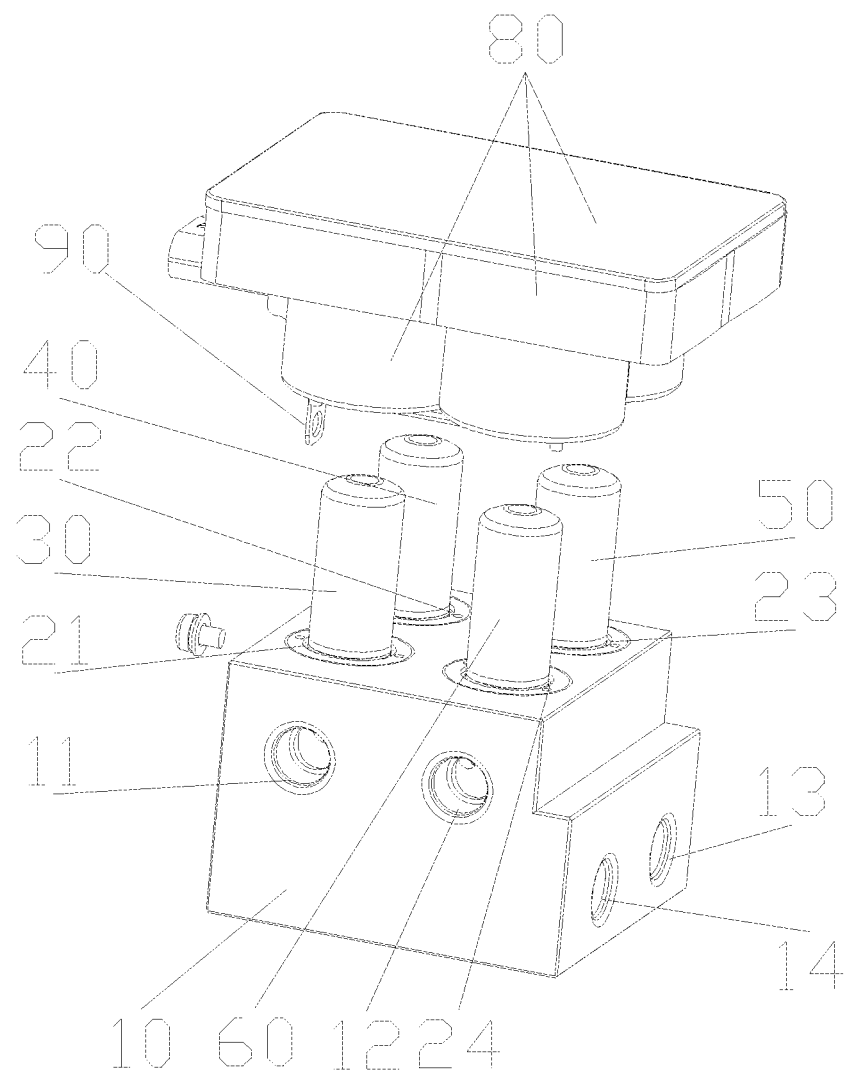
FIG. 7 shows a structural schematic diagram of a combined four-way valve provided in another embodiment of the present disclosure.
Figure 8:
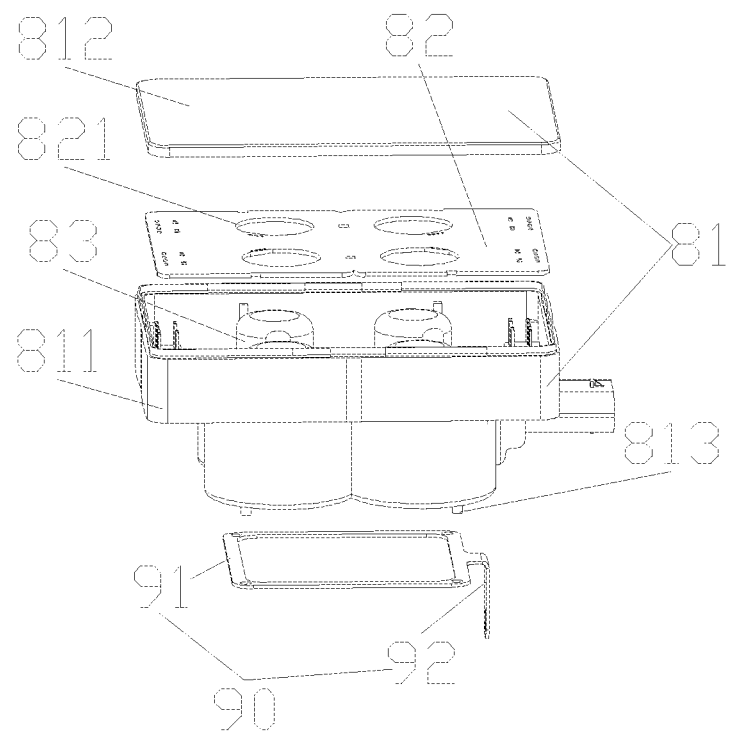
FIG. 8 shows a schematic diagram of a control portion and a fixing member in FIG. 7.

As shown in FIGS. 7-8, another embodiment of the present disclosure provides a combined four-way valve, and different from the above embodiment, the combined four-way valve further includes a control portion 80, where the control portion 80 includes a protective box 81, a circuit board 82 and a plurality of coils 83, the circuit board 82 and the plurality of coils 83 are arranged in the protective box 81; the protective box 81 is connected with the valve seat 10; the plurality of coils 83 are electrically connected to the plurality of control valves in a one-to-one correspondence manner; and the plurality of coils 83 are electrically connected with the circuit board 82.

With the adoption of this solution, the plurality of coils for driving the plurality of control valves to act are arranged in a concentrated manner in the protective box 81 and are connected with the circuit board 82, thus the integrated control portion 80 is formed, the wiring number is reduced, all that is needed is to connect the control portion 80 and the valve seat 10 to the corresponding control valves during assembly, and the assembly efficiency is improved; in addition, cooperative control can be performed on the plurality of control valves by the integrated control portion 80 and replaces the respective and separate control manner, such that the convenience in control is improved.

At least part of the structure of each control valve is mounted in the corresponding valve cavity, and part of the structure of the control valve can protrude out of the valve cavity, such that fitting of the coils 83 in the protective box 81 is more convenient, an occupied space of the coils 83 in the entire protective box 81 is reduced, and the structure is more compact.

In some embodiments, the circuit board 82 is provided with an integrated module and a conversion circuit module, the integrated module is connected with the conversion circuit module, and the plurality of coils 83 are connected with the conversion circuit module. The integrated module is used for centralized control, and the conversion circuit module is used for converting signals, thereby achieving a purpose of cooperative control.

In this solution, the integrated module is used, which greatly simplifies the design and mounting of an entire circuit, and makes the circuit looks simpler; in addition, the integrated module has a certain advantage in the aspect of energy consumption, is low in power consumption and small in size, has certain economic applicability, and has the advantage of high reliability, thereby improving a working reliability of the entire circuit.

In this solution, the conversion circuit module is used, and the conversion circuit module also has the advantages of simple design, high reliability and flexible design; in addition, the conversion circuit module also has the advantages of high power, high efficiency and easiness in maintenance, has multiple input and output choices, and is easier and safer to debug.

In this embodiment, the protective box 81 includes two portions, namely, a box body 811 and a cover plate 812, structures such as the circuit board 82 and the like are arranged in an accommodating cavity of the box body 811, and thus a certain protection effect is achieved on the entire structure; and the plurality of coils 83 are fixed in the accommodating cavity by a pouring technology or an injection molding technology, which limits the positions of the coils 83 in the accommodating cavity, and can also prevent, to a certain extent, the coils 83 from moving. The box body 811 can be connected to the cover plate 812 by fusion, riveting, snap-fitting or welding, which is convenient, safe and easy to operate.

In some embodiments, the circuit board 82 is provided with four avoidance holes 821, and the plurality of coils 83 penetrate into the plurality of avoidance holes 821 in a one-to-one correspondence manner. In this embodiment, the plurality of coils 83 are inserted, in the one-to-one correspondence manner, into the plurality of avoidance holes 821 formed in the circuit board 82, such that the coils are fitted with the circuit board 82, a height of the accommodating cavity in the protective box 81 and a connection height between the control portion 80 and the valve seat are shortened, and a size of the entire structure is reduced.

Specifically, the combined four-way valve further includes a fixing member 90, where the protective box 81 is connected with the valve seat 10 by the fixing member 90.

In this embodiment, the combined four-way valve is designed in such a structure that the protective box 81 is connected with the valve seat 10 by the fixing member 90, the reliable connection between the protective box and the valve seat is facilitated, and the structure stability is ensured.

In some embodiments, the protective box 81 is provided with a plurality of convex columns 813; the fixing member 90 includes an annular member 91 and a connecting member 92 which are connected to each other; the annular member 91 surrounds the plurality of control valves; the annular member 91 is provided with a plurality of fixing holes; the plurality of convex columns 813 penetrate into the plurality of fixing holes in a one-to-one correspondence manner; and the connecting member 92 is connected with the valve seat 10 by fasteners.

In this embodiment, a bottom end of the protective box 81 is provided with the plurality of convex columns 813, which are fitted with the fixing holes in the annular member 91 included by the fixing member 90, thereby achieving fixed connection. For example, the protective box 81 and the convex columns 813 are made of plastic, the fixing member 90 is made of metal, and after the convex columns 813 penetrate through the annular member 91, the portions of the convex columns 813 penetrating through the fixing holes of the annular member 91 are melted and attached, by means of welding, to surfaces of the fixing holes, such that protruding portions of the convex columns 813 become new convex columns that can cover the fixing holes; and after the new convex columns are cooled, the diameters of the protruding portions are greater than those of the fixing holes, snap-fitting of the protective box 81 and the fixing member 90 is achieved. A side face of the fixing member 90 is provided with the connecting member 92, which is connected to the annular member 91 and is arranged perpendicular to the annular member 91, the connecting member is provided with two holes that correspond to holes in the valve seat 10, and the connecting member is fixed to the valve seat by the fasteners such as bolts.

Specifically, in this embodiment, the four control valves are controlled as a whole by an LIN bus, where the second control valve 40 and the fourth control valve 60 are opened and closed synchronously, and the first control valve 30 and the third control valve 50 are opened and closed synchronously.

Figure 9:
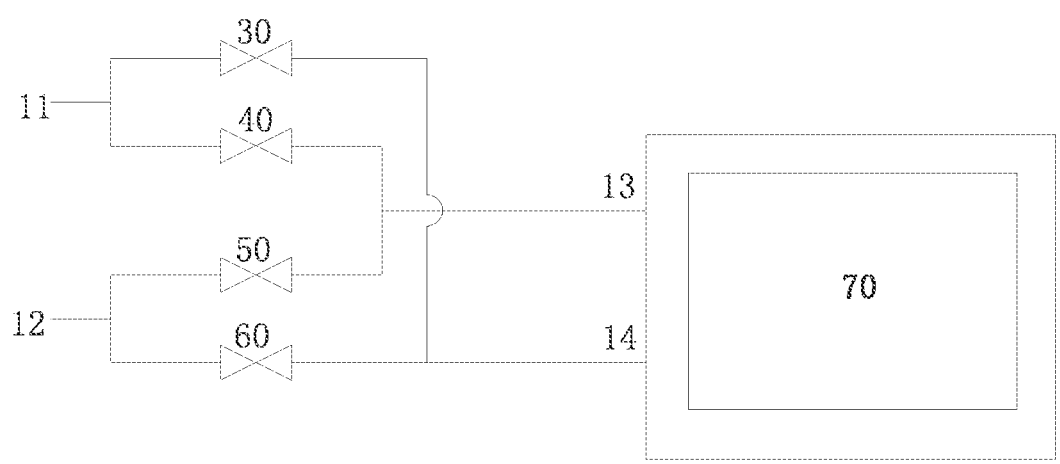
FIG. 9 shows a schematic diagram of an air conditioning system provided in an embodiment of the present disclosure.
Figure 10:
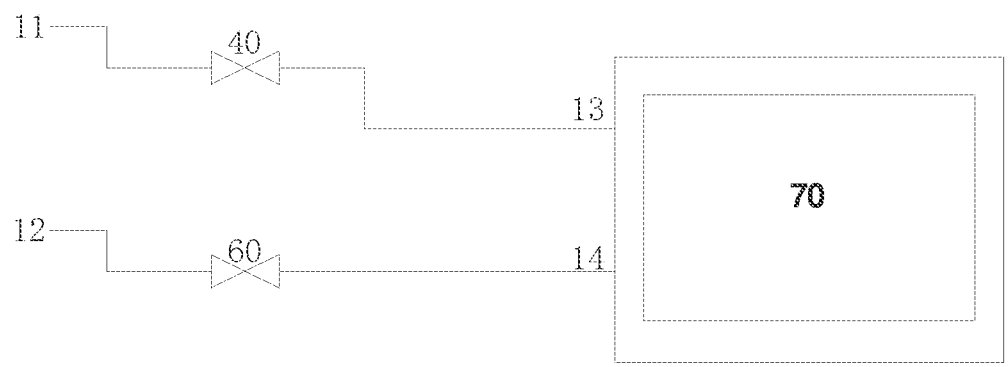
FIG. 10 shows a schematic diagram of a combined four-way valve in the air conditioning system in FIG. 9 in a first state.
Figure 11:
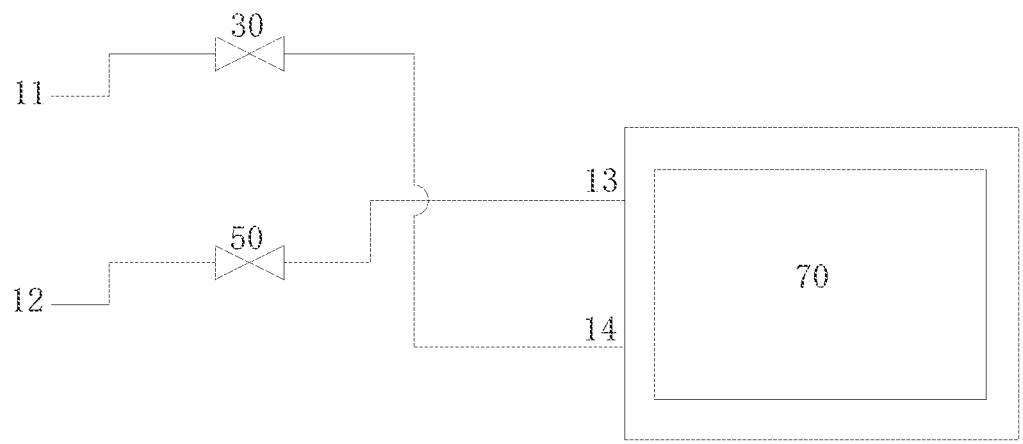
FIG. 11 shows a schematic diagram of the combined four-way valve in the air conditioning system in FIG. 9 in a second state.

As shown in FIGS. 9-11, another embodiment of the present disclosure provides an air conditioning system. The air conditioning system includes a heat exchanger 70 and the above combined four-way valve, where the heat exchanger 70 is provided with a first refrigerant port and a second refrigerant port, the first refrigerant port is in communication with the first opening 13 of the combined four-way valve, and the second refrigerant port is in communication with the second opening 14 of the combined four-way valve. In the air conditioning system, the plurality of control valves are used for respectively controlling the corresponding valve cavities to be opened and closed, and flow paths can be switched by means of opening and closing actions of the different control valves. This solution replaces the manner of using a sliding block in existing four-way valves, such that the problem of the sliding block being prone to moving in a vibrating environment is avoided, the reliability of the air conditioning system is improved, and the air conditioning system can adapt to unstable working environments such as vehicles, therefore ensuring reliable operation.

Some embodiments of the present disclosure further provide the vehicle. The vehicle includes the above air conditioning system.

The technical solutions in the present disclosure can bring the following beneficial effects: 1. the plurality of control valves are used for respectively controlling the corresponding valve cavities to be opened and closed, and the flow paths can be switched by means of the different opening and closing actions; 2. the manner of using the sliding block in the existing four-way valves is replaced, such that the problem that the sliding block is easy to move in the vibrating environment is avoided; and 3. the combined four-way valve has high stability, and can adapt to the unstable working environments such as the vehicles, therefore ensuring reliable operation.

The above are some embodiments of the present disclosure and are not intended to limit the present disclosure, and various changes and modifications may be made on the present disclosure by those skilled in the art. Any modification, equivalent substitution, improvement, etc. made within the spirit and principles of the present disclosure should fall within the scope of protection of the present disclosure.

What is claimed is:

1. A combined four-way valve, comprising:
a valve seat, wherein the valve seat is internally provided with an input port, an output port, a first opening, a second opening, and a plurality of valve cavities which are arranged at intervals; each of the valve cavities is provided with an inlet and an outlet; the plurality of valve cavities comprise a first valve cavity, a second valve cavity, a third valve cavity and a fourth valve cavity; an inlet of the first valve cavity is in communication with the input port, an outlet of the first valve cavity is in communication with an outlet of the fourth valve cavity, the outlet of the fourth valve cavity is in communication with the second opening, an inlet of the second valve cavity is in communication with the inlet of the first valve cavity, an outlet of the second valve cavity is in communication with an outlet of the third valve cavity, the outlet of the third valve cavity is in communication with the first opening, an inlet of the third valve cavity is in communication with an inlet of the fourth valve cavity, and the inlet of the fourth valve cavity is in communication with the output port;
a first control valve arranged in the first valve cavity in an openable and closable manner, so as to control the inlet and the outlet of the first valve cavity to be in communication with or be disconnected from each other;
a second control valve arranged in the second valve cavity in an openable and closable manner, so as to control the inlet and the outlet of the second valve cavity to be in communication with or be disconnected from each other;
a third control valve arranged in the third valve cavity in an openable and closable manner, so as to control the inlet and the outlet of the third valve cavity to be in communication with or be disconnected from each other; and
a fourth control valve arranged in the fourth valve cavity in an openable and closable manner, so as to control the inlet and the outlet of the fourth valve cavity to be in communication with or be disconnected from each other;
wherein the combined four-way valve is capable of being switched to any one of a first operating state and a second operating state;
in response to that the combined four-way valve is in the first operating state, the second control valve and the fourth control valve are opened, and the first control valve and the third control valve are closed, such that the input port is in communication with the first opening, and the second opening is in communication with the output port; and
in response to that the combined four-way valve is in the second operating state, the second control valve and the fourth control valve are closed, and the first control valve and the third control valve are opened, such that the input port is in communication with the second opening, and the first opening is in communication with the output port.

2. The combined four-way valve according to claim 1, wherein the valve seat is further internally provided with a first channel, a second channel, a third channel and a fourth channel; the inlet of the first valve cavity is in communication with the inlet of the second valve cavity by the first channel; the inlet of the third valve cavity is in communication with the inlet of the fourth valve cavity by the second channel; the outlet of the first valve cavity is in communication with the outlet of the fourth valve cavity by the third channel; and the outlet of the second valve cavity is in communication with the outlet of the third valve cavity by the fourth channel.

3. The combined four-way valve according to claim 2, wherein the first channel and the input port are arranged coaxially, and the second channel and the output port are arranged coaxially; and the second valve cavity is located on a side of the first valve cavity facing away from the input port, and the third valve cavity is located on a side of the fourth valve cavity facing away from the output port.

4. The combined four-way valve according to claim 2, wherein the third channel and the second opening are arranged coaxially, and the fourth channel and the first opening are arranged coaxially; and the first valve cavity is located on a side of the fourth valve cavity facing away from the second opening, and the second valve cavity is located on a side of the third valve cavity facing away from the first opening.

5. The combined four-way valve according to claim 2, wherein the first channel, the second channel, the third channel and the fourth channel are blind holes.

6. The combined four-way valve according to claim 1, wherein depth directions of the plurality of valve cavities are a same direction, and in the depth directions of the plurality of valve cavities, the valve seat is provided with a first region and a second region which are spaced apart from each other; and the input port, the output port and inlets of the plurality of valve cavities are located in the first region, and the first opening, the second opening and outlets of the plurality of valve cavities are located in the second region.

7. The combined four-way valve according to claim 6, wherein an axis of the input port is parallel to an axis of the output port, an axis of the first opening is parallel to an axis of the second opening, the axis of the input port is perpendicular to the axis of the first opening, the axis of the input port is perpendicular to the depth directions of the plurality of valve cavities, and the axis of the first opening is perpendicular to the depth directions of the plurality of valve cavities.

8. The combined four-way valve according to claim 1, wherein the first control valve, the second control valve, the third control valve and the fourth control valve are electronic expansion valves; and the first control valve, the second control valve, the third control valve and the fourth control valve are detachably arranged on the valve seat.

9. The combined four-way valve according to claim 1, further comprising a control portion, wherein the control portion comprises a protective box, and a circuit board and a plurality of coils which are arranged in the protective box; the protective box is connected with the valve seat; the plurality of coils are electrically connected to a plurality of control valves in a one-to-one correspondence manner; and the plurality of coils are electrically connected to the circuit board.

10. The combined four-way valve according to claim 9, wherein the circuit board is provided with an integrated module and a conversion circuit module, the integrated module is connected with the conversion circuit module, and the plurality of coils are connected to the conversion circuit module.

11. The combined four-way valve according to claim 9, wherein the protective box comprises a box body and a cover plate which are connected to each other, the box body is provided with an accommodating cavity, the circuit board is located in the accommodating cavity, and the plurality of coils are fixed in the accommodating cavity.

12. The combined four-way valve according to claim 9, wherein the circuit board is provided with a plurality of avoidance holes, and the plurality of coils penetrate into the plurality of avoidance holes in a one-to-one correspondence manner.

13. The combined four-way valve according to claim 9, further comprising a fixing member, wherein the protective box is connected with the valve seat by the fixing member.

14. The combined four-way valve according to claim 13, wherein the protective box is provided with a plurality of convex columns; the fixing member comprises an annular member and a connecting member which are connected to each other; the annular member surrounds the plurality of control valves; the annular member is provided with a plurality of fixing holes; the plurality of convex columns penetrate into the plurality of fixing holes in a one-to-one correspondence manner; and the connecting member is connected with the valve seat by fasteners.

15. An air conditioning system, comprising a heat exchanger and the combined four-way valve according to claim 1, wherein the heat exchanger is provided with a first refrigerant port and a second refrigerant port, the first refrigerant port is in communication with the first opening of the combined four-way valve, and the second refrigerant port is in communication with the second opening of the combined four-way valve.

16. The air conditioning system according to claim 15, wherein the valve seat is further internally provided with a first channel, a second channel, a third channel and a fourth channel; the inlet of the first valve cavity is in communication with the inlet of the second valve cavity by the first channel; the inlet of the third valve cavity is in communication with the inlet of the fourth valve cavity by the second channel; the outlet of the first valve cavity is in communication with the outlet of the fourth valve cavity by the third channel; and the outlet of the second valve cavity is in communication with the outlet of the third valve cavity by the fourth channel.

17. The air conditioning system according to claim 16, wherein the first channel and the input port are arranged coaxially, and the second channel and the output port are arranged coaxially; and the second valve cavity is located on a side of the first valve cavity facing away from the input port, and the third valve cavity is located on a side of the fourth valve cavity facing away from the output port.

18. The air conditioning system according to claim 16, wherein the third channel and the second opening are arranged coaxially, and the fourth channel and the first opening are arranged coaxially; and the first valve cavity is located on a side of the fourth valve cavity facing away from the second opening, and the second valve cavity is located on a side of the third valve cavity facing away from the first opening.

19. The air conditioning system according to claim 16, wherein the first channel, the second channel, the third channel and the fourth channel are blind holes.

20. A vehicle, comprising the air conditioning system according to claim 15.

\* \* \* \* \*